(12) United States Patent
Gong

(10) Patent No.: US 7,062,433 B2
(45) Date of Patent: Jun. 13, 2006

(54) METHOD OF SPEECH RECOGNITION WITH COMPENSATION FOR BOTH CHANNEL DISTORTION AND BACKGROUND NOISE

(75) Inventor: Yifan Gong, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 883 days.

(21) Appl. No.: 10/051,640

(22) Filed: Jan. 18, 2002

(65) Prior Publication Data

US 2002/0173959 A1    Nov. 21, 2002

Related U.S. Application Data

(60) Provisional application No. 60/275,487, filed on Mar. 14, 2001.

(51) Int. Cl.
*G10L 15/10*    (2006.01)

(52) U.S. Cl. .................. 704/226; 704/228; 704/255; 704/256

(58) Field of Classification Search ............... 704/226, 704/228, 255, 256, 257
See application file for complete search history.

(56) References Cited

U.S. PATENT DOCUMENTS

| | | | |
|---|---|---|---|
| 5,537,647 A * | 7/1996 | Hermansky et al. | 704/211 |
| 5,924,065 A * | 7/1999 | Eberman et al. | 704/231 |
| 6,691,091 B1 * | 2/2004 | Cerisara et al. | 704/255 |
| 6,912,497 B1 * | 6/2005 | Gong | 704/228 |

OTHER PUBLICATIONS

Afify et al., "A General Joint Additive and Convolutive Bias Compensation Approach Applied to Noisy Lombard Speech Recognition," IEEE Transactions on Speech and Audio Processing, Nov. 1998, vol. 6, No. 6, pp. 524-538.*

Hirsch, Hans Gunter., "Adaptation of HMMS in the Presence of Additive and Convolutional Noise," IEEE, Apr. 1997, pp. 412-419.*

Tetsuo Kosaka et al., "Instantaneous Environment Adaptation Techniques Based on Fast PMC and MAP-CMS Methods" Acoustics, Speech and Signal Processing, IEEE, pp. 789-792, 1998.

Hiroki Yamamoto et al., "Fast Speech Recognition Algorithm Under Noisy Environment Using Modified CMS-PMC and Improved IDMM+SQ" Acoustics, Speech and Signal Processing, IEEE, pp. 847-850, 1997.

M. Shozakai et al., "A Non-Iterative Model-Adaptive E-CMN/PMC Approach for Speech Recognition in Car Environments" 5th European Conference on Speech Communication and Technology, Sep. 22-25, 1997, Rhodes, Greece.

* cited by examiner

*Primary Examiner*—Richemond Dorvil
*Assistant Examiner*—Donald Young
(74) *Attorney, Agent, or Firm*—W. James Brady, III; Frederick J. Telecky, Jr.

(57) ABSTRACT

A method of speech recognition with compensation is provided by modifying HMM models trained on clean speech with cepstral mean normalization. For all speech utterances the MFCC vector is calculated for the clean database. This mean MFCC vector is added to the original models. An estimate of the background noise is determined for a given speech utterance. The model mean vectors adapted to the noise are determined. The mean vector of the noisy data over the noisy speech space is determined and this is removed from model mean vectors adapted to noise to get the target model.

16 Claims, 1 Drawing Sheet

METHOD OF SPEECH RECOGNITION WITH COMPENSATION FOR BOTH CHANNEL DISTORTION AND BACKGROUND NOISE

This application claims priority under 35 USC § 119(e)(1) of provisional application No. 60/275,487, filed Mar. 14, 2001.

FIELD OF INVENTION

This invention relates to speech recognition and more particularly to compensation for both background noise and channel distortion.

BACKGROUND OF INVENTION

A speech recognizer trained with relatively a quiet office environment speech data and then operating in a mobile environment may fail due to at least to the two distortion sources of back ground noise and microphone changes. The background noise may, for example, be from a computer fan, car engine, and/or road noise. The microphone changes may be due to the quality of the microphone, whether the microphone is hand-held or hands-free and, the position of the microphone to the mouth. In mobile applications of speech recognition, both the microphone conditions and background noise are subject to change.

Cepstral Mean Normalization (CMN) removes utterance mean and is a simple and effective way of dealing with convolutive distortion such as telephone channel distortion. See "Effectiveness of Linear Prediction Characteristics of the Speech Wave for Automatic Speaker Identification and Verification" of B. Atal in Journal of Acoustics Society of America, Vol. 55: 1304–1312, 1974. Spectral Subtraction (SS) reduces background noise in the feature space. See article "Suppression of Acoustic Noise in Speech Using Spectral Subtraction" of S. F. Boll in IEEE Transactions on Acoustics, Speech and Signal Processing, ASSP-27(2): 113–129, April 1979. Parallel Model Combination (PMC) gives an approximation of speech models in noisy conditions from noise-free speech models and noise estimates. See "An Improved Approach to the Hidden Markov Model Decomposition of Speech and Noise" of M. J. F. Gales and S. Young in Proceedings of IEEE International Conference on Acoustics, Speech and Signal Processing, Volume 1, pages 233–236, U.S.A., April 1992. The techniques do not require any training data.

Joint compensation of additive noise and convolutive noise can be achieved by the introduction of a channel model and a noise model. A spectral bias for additive noise and a cepstral bias for convolutive noise are introduced in an article by M. Afify, Y. Gong, and J. P. Haton. This article is entitled "A General Joint Additive and Convolutive Bias Compensation Approach Applied to Noisy Lombard Speech Recognition" in IEEE Trans. on Speech and Audio Processing, 6(6): 524–538, November 1998. The two biases can be calculated by application of Expectation Maximization (EM) in both spectral and convolutive domains. A procedure by J. L. Gauvain, et al, is presented to calculate the convolutive component, which requires rescanning of training data. See J. L. Gauvain, L. Lamel, M. Adda-Decker, and D. Matrouf entitled "Developments in Continuous Speech Dictation using the ARPA NAB News Task." In Proc. of IEEE International Conference on Acoustics, Speech, and Signal Processing, pages 73–76, Detroit, 1996. Solution of the convolutive component by a steepest descent method has also been reported. See Y. Minami and S. Furui entitled "A Maximum Likelihood Procedure for a Universal Adaptation Method Based on HMM Composition." See Proc. of IEEE International Conference on Acoustics, Speech and Signal Processing, pages 129–132, Detroit, 1995. A method by Y. Minami and S. Furui needs additional universal speech models, and re-estination of channel distortion with the universal models when channel changes. See Y. Minami and S. Furui entitled "Adaptation Method Based on HMM Composition and EM Algorithm" in Proceedings of IEEE International Conference on Acoustics, Speech and Signal Processing, pages 327–330, Atlanta 1996.

The techniques presented by M. F. J. Gales in "PMC for Speech Recognition in Additive and Convolutional Noise," Technical Report TR-154, CUED/F-INFENG, December 1993 needs two passes of the test utterance, e.g., parameter estimation followed by recognition, several transformations between cepstral and spectral domains, and a Gaussian mixture model for clean speech.

Alternatively, the nonlinear changes of both type of distortions can be approximated by linear equations, assuming that the changes are small. A Jacobian approach, which models speech model parameter changes as the product of a jacobian matrix and the difference in noisy conditions, and statistical linear approximation are along this direction. See S. Sagayama, Y. Yamaguchi, and S. Takahashi entitled "Jacobian Adaptation of Noisy Speech Models," in Proceedings of IEEE Automatic Speech Recognition Workshop, pages 396–403, Santa Barbara, Calif., USA, December 1997. IEEE Signal Processing Society. Also see "Statistical Linear Approximation for Environment Compensation" of N. S. Kim, IEEE Signal Processing Letters, 5(1): 8–10, January 1998.

Maximum Likelihood Linear Regression (MLLR) transforms HMM parameters to match the distortion factors. See "Maximum Likelihood Linear Regression for Speaker Adaptation of Continuous Density HMMs" by C. J. Leggetter and P. C. Woodland in Computer, Speech and Language, 9(2): 171–185, 1995. This method is effective for both sources but requires training data and introduces the dependence to the speakers.

SUMMARY OF INVENTION

In accordance with one establishment of the present invention a new method is disclosed that simultaneously handles noise and channel distortions to make a speaker independent system robust to a wide variety of noises and channel distortions.

DESCRIPTION OF PREFERRED EMBODIMENTS OF THE PRESENT INVENTIONS

Figure 1:
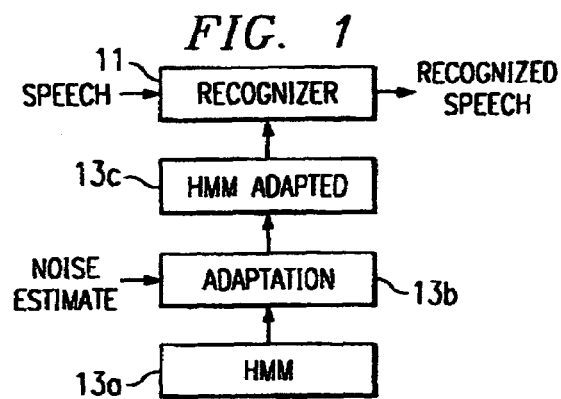
FIG. 1 illustrates a speech recognizer according to one embodiment of the present invention.

Referring to FIG. 1 there is illustrated a speech recognizer according to the present invention. The speech is applied to recognizer 11. The speech is compared to Hidden Markov Models (HMM) 13 to recognize the text. The models initially provided are those based on speech recorded in a quiet environment with a microphone of good quality. We want to develop a speech model set suitable for operating in the simultaneous presence of channel/microphone distortion and background noise. In accordance with the present invention, a speech model set is provided using statistics about the noise and speech.

Figure 2:
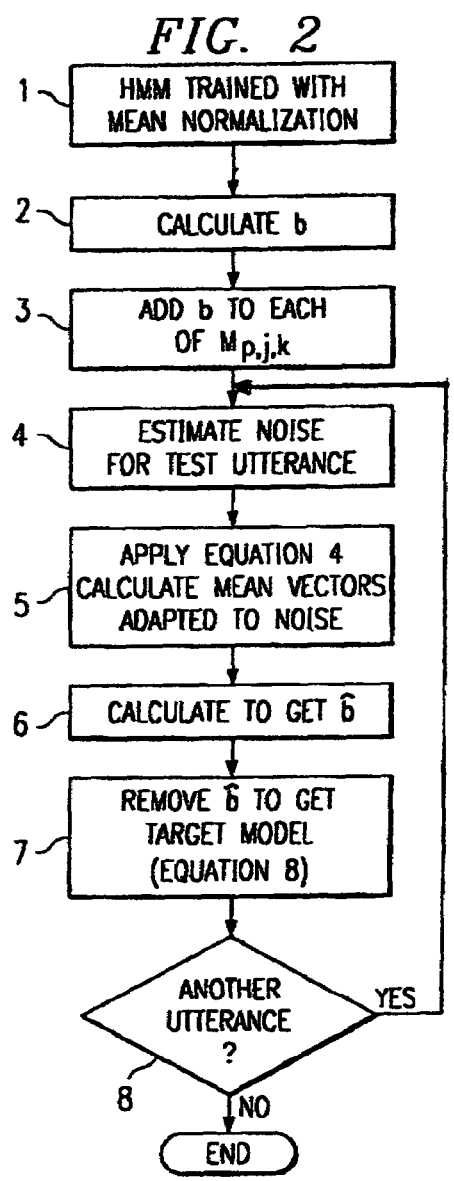
FIG. 2 illustrates the method of the present invention.

Referring to FIG. 2, the first Step 1 is to start with HMM models trained on clean speech, with cepstral mean normalization. We modify these models to get models to compensate for channel/microphone distortion (convolutive distortion) and simultaneous background noise (additive distortion). The HMM modeling method of this invention represents the acoustic probability density function (PDF) corresponding to each HMM state as a mixture of Gaussian components, as is well known in the art. Such HMM models, have many parameters, such as Gaussian component mean vectors, covariances, and mixture component weights for each state, as well as HMM state transition probabilities. The method of this invention teaches modifying the mean vectors $m_{p,j,k}$ of the original model space, where p is the index of the HMM, j is the state and k is the mixing component.

The second Step 2 is to calculate the mean mel-scaled cesptrum coefficients (MFCC) vector over the trained database. Scan all data and calculate the mean to get b.

The third Step 3 is to add mean b to each of this mean vector pool represented by $m_{p,j,k}$ equation (1) to get:

$$\overline{m}_{p,j,k} = m_{p,j,k} + b. \quad (1)$$

For example, there could be 100 HMMs, 3 states per HMM and 2 vectors per state, or a total of 600 vectors.

The fourth Step 4 is for a given input test utterance, an estimate of the background noise vector $\tilde{X}$ is calculated.

Let $u^l \underline{\Delta} [u_1^l, u_2^l, \ldots u_D^l]^T$ and $v^l \underline{\Delta} [v_1^l, v_2^l, \ldots v_D^l]^T$, where l means that the values are represented in log-spectral domain.

We introduce the combination operator ⊕ such that:

$$w^l \underline{\Delta} u^l \oplus v^l = [w_1^l, w_2^l, \ldots w_D^l]^T \quad (2)$$

with $$w_j^l = \log(\exp(u_j^l) + \exp(v_j^l)) \quad (3)$$

In Step 5, we calculate the mean vectors adapted to the noise $\tilde{X}$ using equation 4.

$$\hat{m}_{p,j,k} = \text{IDFT}(\text{DFT}(\overline{m}_{p,j,k}) \oplus \text{DFT}(\tilde{X})). \quad (4)$$

where DFT and IDFT are, respectively, the DFT and inverse DFT operation, $\hat{m}_{p,j,k}$ is the noise compensated mean vector.

Equation 4 involves several operators. DFT is the Discrete Fourier Transform and IDFT is the Inverse Discrete Fourier Transform, which are respectively used to convert from the cepstrum domain to the log spectrum domain, and vice versa. The ⊕ is an operation applied to two log spectral vectors to produce a log spectral vector representing the linear sum of spectra. The operation ⊕ is defined by equations 2 and 3. Equation 2 defines the operation ⊕ which operates on two D dimensional vectors u and v and the result is a vector of D dimensions, $[w_1^l, w_2^l, \ldots w_D^l]^T$ where T is the transposition. Equation 3. defines the jth element in that vector ($w_j^l$). This completes the definition of Equation 4.

In the following steps, we need to remove the mean vector $\hat{b}$ of the noisy data y over the noisy speech space N (from the resultant model). One may be able to synthesize enough noisy data from compensated models but this requires a lot of calculation. In accordance with the present invention the vector is calculated using statistics of the noisy models. The whole recognizer will operate with CMN (cepstral mean normalization mode), but the models in Equation 4 are no longer mean normalized. We have dealt with additive noise.

The second half of the processing is removing the cepstral mean of our models defined in Equation 4. This is not difficult because we have the models in Equation 4. In Step 6, we need to integrate all the samples generated by Equation 4 to get the mean $\hat{b}$. Equation 5 is this integration.

Let H be the variable denoting HMM index, J be the variable for state index, and K be the variable for mixing component index.

$$\hat{b} = E\{y\} \quad (5)$$

$$= \int_N y \sum_p \sum_j \sum_k P_H(p) P_{J|H}(j \mid p) P_{K|H,J}$$

$$(k \mid p, j) P_{Y|H,J,K}(y \mid pj, k) dy$$

Since $$p(y|p,j,k) = N(y, \text{IDFT}(\text{DFT}(\overline{m}_{p,j,k}) \oplus \text{DFT}(\tilde{X})), -_{p,j,k}) \quad (6)$$

We have $$\hat{b} = \sum_p \sum_j \sum_k P_{,}(p) P_{J|,}(j|p) P_{K|,J}(k|p, j) \hat{m}_{p,j,k} \quad (7)$$

Equation 7 shows that $\hat{b}$ can be worked out analytically, and it is not necessary to do the physical generation and integration. The final result is represented by Equation 7 which reduces the integration into sums over HMMs, over states and over mixing components. Finally the estimated noise-compensated channel bias, $\hat{b}$, is removed from the compensated model means to get the target model means. This is Step 7. The target model is:

$$\dot{m}_{p,j,k} = \hat{m}_{p,j,k} - \hat{b} \quad (8)$$

This resulting target model means are the desired modified parameters of the HMM models used in the recognizer. This operation is done for each utterance. FIG. 2 illustrates that for a next utterance (Step 8) the process starts with step 4.

Calculation of $\hat{b}$ requires the knowledge of the probabilities of each PDF. There are two issues with the probilities:

They needs additional storage space.

They are dependent of the recognition task e.g. vocabulary, grammar.

Although it is possible to obtain the probabilities, we can also consider the following simplified cases.

The operations to calculate $\hat{b}$ can be simplified by assuming $$P_H(p) = C$$

$$P_{J|H}(j|p) = D$$

$$P_{K|H,J}(k|p,j) = E \quad (10)$$

C, D and B are selected such that they represent equal probabilities. Therefore we have the following: C is chosen such that it provides a probability such that each HMM is likely, so C=1/(number of HMM models); D is chosen such that each state of a given HMM is equally likely, where the HMM is indexed by p, so D=1/(number of states in HMM (p)); and E is chosen such that each mixing component of a state of an HMM is equally likely, where the state of an HMM is indexed by j, so E1/(number of mixing components in HMM(p) state(j)).

In fact, the case described in Eq-10 consists in averaging the compensated mean vectors $\hat{m}_{p,j,k}$. Referring to Eq-4 and Eq-1, it can be expected that the averaging reduces the speech part $m_{p,j,k}$ just as CMN does. Therefore, Eq-7 could be further simplified into:

$$\hat{b} = \text{IDFT}(\text{DFT}(b) \oplus \text{DFT}(\tilde{X})). \tag{11}$$

The model $\hat{m}_{p,j,k}$ of Eq-8 is then used with CMN on noisy speech.

A database containing recordings in a car was used.

HMMs used in all experiments were trained using clean speech data. Utterance-based cepstral mean normalization was used.

Experimental results show that the new invented method reduces word error rate by 61% to 94% relative to baseline performance depending on driving condition, and the new method is superior to othe reported methods.

What is claimed is:

1. A method of modifying HMM models trained on clean speech with cepstral mean normalization to provide models that compensate for simultaneous channel/microphone distortion and background noise (additive distortion) comprising the steps of:

providing HMM models trained on clean speech with expstral mean normalization;

for each speech utterance calculating the mean mel-scaled cepstrum coefficients (MFCC) vector b over a clean database;

adding the mean MFCC vector b to the mean vectors $m_{p,j,k}$ of the original HMM models where p is the HMM index, j is the state index, and k the mixing component index, to obtain non-CMN mean vectors $\overline{m}_{p,j,k}$;

for a given speech utterance calculating an estimate of the background noise vector $\tilde{X}$;

calculating the model mean vectors $\hat{m}_{p,j,k}$ adapted to the noise $\tilde{X}$ using $\hat{m}_{p,j,k}$=IDFT (DFT ($\overline{m}_{p,j,k} \oplus$ DFT ($\tilde{X}$)) to get the noise compensated mean vectors; and calculating the mean vector $\hat{b}$ of the noisy data over the noisy speech space, and removing the mean vector $\hat{b}$ of the noisy data from the model mean vectors adapted to noise to obtain the target HMM model mean vectors and modifying said HMM models to compensate simultaneously for convolutive distortion and background noise using said HMM model mean vectors.

2. The method of claim 1 wherein the step of calculating the mean vector $\hat{b}$ of the noisy data over the noisy speech space will calculate the vector using statistics of noisy models using:

$$\hat{b} = \sum_p \sum_j \sum_k P_H(p) P_{J|H}(j \mid p) P_{K|H,J}(k \mid p, j) \hat{m}_{p,j,k}$$

where H is the variable denoting HMM Index, J is the variable for the state index and K is the variable for mixing component index.

3. The method of claim 2 wherein said calculating the mean vector $\hat{b}$ uses equal probabilities for $P_H(p)$ $$P_H(p)=C.$$

4. The method of claim 2 wherein equal probabilities for $P_H(p)$, $P_{J|H}P(j|p)$ and $P_{K|H,J}(k|p,j)$ is used $$P_H(p)=C$$

$$P_{J|H}(j|p)=D$$

$$P_{K|H,J}(k|p,j)=E.$$

5. The method of claim 3 wherein mean vector $\hat{b}$ becomes equal to:

$$\hat{b} = \text{IDFT}(\text{DFT}(b) \oplus \text{DFT}(\tilde{X})).$$

6. A method of speech recognition with compensation for channel distortion and background noise comprising the steps of:

providing HMM models trained on clean speech with cepstral mean normalization;

for all utterances of a training database:

calculating the mean mel-scaled cepstrum coefficients (MFCC) vector b over a clean database;

adding the mean MFCC vector b to the mean vectors $m_{p,j,k}$ of the original HMM models where p is the index of HMM, j is the state, and k the mixing component to obtain $\hat{m}_{p,j,k}$;

for a given speech utterance calculating an estimate of the background noise vector $\tilde{X}$;

calculating the model mean vectors adapted to the noise $\tilde{X}$ using $\hat{m}_{p,j,k}$=IDFT (DFT ($\overline{m}_{p,j,k} \oplus$ DFT ($\tilde{X}$)) to get the noise compensated mean vectors; and calculating the mean vector $\hat{b}$ of the noisy data over the noisy speech space, and removing the mean vector $\hat{b}$ of the noisy data from the model mean vectors adapted to noise to get the target model; and comparing the target model to the speech input utterance to recognize speech.

7. The method of claim 6 wherein the step of calculating the mean vector $\hat{b}$ of the noisy data over the noisy speech space will calculate the vector using statistics of noisy model using:

$$\hat{b} = \sum_p \sum_j \sum_k P_H(p) P_{J|H}(j \mid p) P_{K|H,J}(k \mid p, j) \hat{m}_{p,j,k}$$

where H is the variable denoting HMM Index, J is the variable for the state index and K is the variable for mixing component index.

8. The method of claim 7 wherein said calculating the mean vector $\hat{b}$ uses equal probabilities for $P_H(p)$ $$P_H(p)=C.$$

9. The method of claim 7 wherein equal probabilities for $P_H(p)$, $P_{J|H}P(j|p)$ and $P_{K|H,J}(k|h,j)$ is used $$P_H(p)=C$$

$$P_{J|H}(j|p)=D$$

$$P_{K|H,J}(k|p,j)=E.$$

10. The method of claim 9 wherein mean vector $\hat{b}$ becomes equal to:

$$\hat{b} = \text{IDFT}(\text{DFT}(b) \oplus \text{DFT}(\tilde{X})).$$

11. A speech recognizer with compensation for channel distortion and background noise comprising in combination:

adapted HMM models generated by modifying HMM models trained on clean speech with cepstral mean normalization wherein said models are adapted by:

for all utterances of the a database:

calculating the calculating the mean mel-scaled cepstrum coefficients (MFCC) vector b over the clean database;

adding the mean MFCC vector b to the mean vectors $m_{p,j,k}$ of the original HMM models where p is the index of HMM, j is the state, and k the mixing component to obtain $\hat{m}_{p,j,k}$;

for a given speech utterance calculating an estimate of the background noise vector $\tilde{X}$;

calculating the model mean vectors adapted to the noise $\tilde{X}$ using $\hat{m}_{p,j,k}$=IDFT (DFT ($\overline{m}_{p,j,k}\oplus$DFT ($\tilde{X}$)) to get the noise compensated mean vectors; and calculating the mean vector $\tilde{b}$ of the noisy data over the noisy speech space, and removing the mean vector $\tilde{b}$ of the noisy data from the model mean vectors adapted to noise to get the adapted model; and means for comparing the adapted model to the speech input utterance to recognize the input speech.

12. The recognizer of claim 11 wherein the step of calculating the mean vector $\tilde{b}$ of the noisy data over the noisy speech space will calculate the vector using statistics of noisy model using:

$$\hat{b} = \frac{y}{N}\sum_p\sum_j\sum_k P_H(p)P_{J|H}(j|p)P_{K|H,J}(k|p,j)\hat{m}_{p,j,k}$$

where H is the variable denoting HMM index J is the variable for the state index and K is the variable for mixing component index.

13. The recognizer of claim 12 wherein said calculating the mean vector $\tilde{b}$ uses equal probabilities for $P_H(p)$ $$P_H(p)=C.$$

14. The recognizer of claim 12 wherein equal probabilities for $P_H(p)$, $P_{J|H}(j|p)$ and $P_{K|H,J}(k|h,j)$ is used $$P_H(p)=C$$

$$P_{J|H}(j|p)=D$$

$$P_{K|H,J}(k|p,j)=E.$$

15. The method of claim 12 wherein mean vector $\tilde{b}$ becomes equal to:

$$\tilde{b}=\text{IDFT}(\text{DFT}(b)\oplus\text{DFT}(\tilde{X})).$$

16. A method of speech recognition with simultaneous compensation for both channel/microphone distortion and background noise comprising the steps of:

modifying HMM models trained on clean speech with cepstral mean normalization;

for all training speech utterances calculating the MFCC vector for a clean database;

adding this mean MFCC vector to the original HMM models;

estimating the background noise for a given speech utterance;

determining the model mean vectors adapted to the noise;

determining the mean vector of the noisy data over the noisy speech space; and removing the mean vector of the noisy data over the noisy speech space from the model mean vectors adapted to the noise to get the target model.

* * * * *